United States Patent [19]

Thaller et al.

[11] Patent Number: 5,305,354
[45] Date of Patent: Apr. 19, 1994

[54] ABORTING SYNCHRONIZER

[75] Inventors: Kurt M Thaller, Acton; Nitin D. Godiwala, Boylston, both of Mass.

[73] Assignee: Digital Equipment corporation, Maynard, Mass.

[21] Appl. No.: 874,237

[22] Filed: Apr. 24, 1992

[51] Int. Cl.[5] ............................................. H04L 7/00
[52] U.S. Cl. ...................................... 375/106; 375/110
[58] Field of Search .................... 375/104, 106, 110; 307/269, 265, 272.1, 601; 328/164, 185

[56] References Cited

U.S. PATENT DOCUMENTS

| | | | |
|---|---|---|---|
| 4,451,917 | 5/1984 | DeCoursey | 375/106 |
| 4,843,617 | 6/1989 | Marshall et al. | 375/110 |
| 5,018,168 | 5/1991 | Matsuka | 375/106 |
| 5,101,419 | 3/1992 | Lowe et al. | 375/106 |
| 5,150,385 | 9/1992 | Maxey, Jr. et al. | 325/106 |

*Primary Examiner*—Stephen Chin
*Attorney, Agent, or Firm*—Kenyon & Kenyon

[57] ABSTRACT

A N-stage synchronizer for synchronizing asynchronous signals in a destination system's time domain. The synchronizer has N-stages with each stage having a series connected logic gate and flip-flop, and each of the N-stages are connected in series. Each logic gate has the output of the previous stage input thereto along with an ABORT signal. The ABORT signal when asserted blocks the synchronization of the asynchronous signal. The synchronizer permits a reduction in the latency associated with the synchronization process while not affecting reliability.

12 Claims, 3 Drawing Sheets

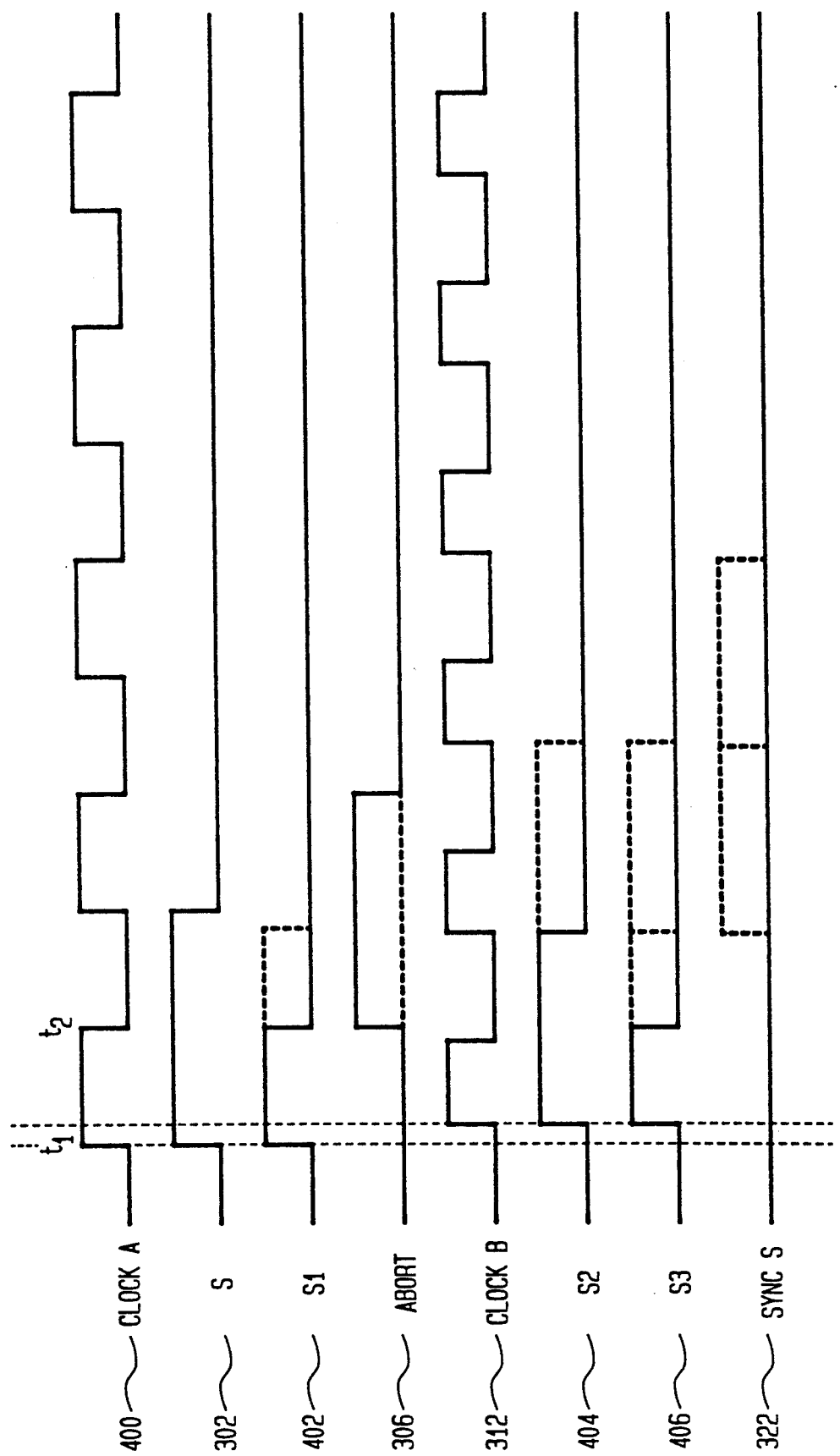

ABORTING SYNCHRONIZER

FIELD OF THE INVENTION

The present invention relates to apparatuses for converting asynchronous signals into synchronous signals. More particularly, the present invention relates to synchronizer devices that reduce the latency associated with the synchronizing operation.

BACKGROUND OF THE INVENTION

In many computer applications, various devices need to communicate. Often, these devices operate at different clocking frequencies or at the same frequency but asynchronously. The usual method to synchronize such devices so that they may communicate is to use a synchronizer.

A known synchronizer is shown in FIG. 1 generally at 100. Synchronizer 100 is an N-stage synchronizer. This synchronizer has a number of stages and there is a flip-flop at each stage. The flip-flops at adjacent stages are connected in series. As shown in FIG. 1, synchronizer 100 has first stage flip-flop 102, second stage flip-flop 104, and Nth-stage flip-flop 106. These are representative of all of the N flip-flops of synchronizer 100.

The asynchronous signal input at 108 is input to the data input first stage flip-flop 102. This flip-flop is clocked according to destination time domain clock signal 110. The data input of each of the remaining N−1 flip-flops is loaded by the output from the previous stage flip-flop and each of the remaining N−1 flip-flops is clocked by destination time domain clock signal 110. The result is synchronous output 112.

The greater the number of series-connected flip-flops, the more likely that the output of the synchronizer will not go to a metastable state. Moreover, the greater the number of flip-flops, the more likely that the output of the synchronizer will be fully synchronized. However, a significant drawback of a N-stage synchronizer, such as that shown in FIG. 1, is that the greater the number of stages, the greater the latency from the asynchronous input to the synchronous output. The alternative is to accept the latency, or use of fewer number flip-flop stages and accept reduced reliability.

An example illustrating the latency problem will be explained referring to FIG. 2. A portion of a state machine is shown generally at 200. This state machine is required to generate a synchronous signal in a predetermined time domain when, and if, it reaches State C 214. As is shown, the state machine progresses from State A 210 to State B 212, and then to State C 214 or D 216. Known systems process signals through States A 210 and B 212, and if state machine 200 enters State C 214, the state machine will then synchronize the signal. In this case, the synchronization latency is accepted.

Accordingly, there is a need for a synchronizer that reduces latency problems without reducing reliability. These problems and other problems are addressed by the present invention that is disclosed in the remainder of the specification and shown in the drawings.

SUMMARY OF THE INVENTION

The present invention is a N-stage synchronizer that reduces the latency normally associated with large N-stage synchronizers without reducing reliability.

The synchronizer of the present invention is a N-stage synchronizer that includes a flip-flop at each stage. The flip-flops of adjacent stages are connected in series. This synchronizer, however, has an AND gate associated with the input at each stage flip-flop. The inputs to the AND gate at the first stage are the asynchronous signal and an ABORT signal. The inputs to each AND gate of the remaining N−1 stages are the output of the previous stage flip-flop and the ABORT signal. The ABORT signal is used to block propogation of the asynchronous signal at any of the stages.

In the operation of the N-stage synchronizer of the present invention, an asynchronous signal is input to the AND gate associated with the first stage. The second input to the AND gate is to its negative/true input. The signal input there is the ABORT signal. Therefore, if the de-asserted ABORT signal is input to the negative/true input, the signal actually input to this AND gate is a logic high signal. As long as the ABORT signal remains de-asserted, the output of the AND gate will track the asynchronous signal.

The output of the AND gate is input to the first stage flip-flop. This flip-flop is clocked by the destination time domain clock signal. The output of the first stage flip-flop is input of the second stage AND gate. The second input to the second stage AND gate is the ABORT signal. The ABORT signal, as before, is input to a negative/true input of the second stage AND gate. As long as the ABORT signal is de-asserted, the output of the second stage AND gate will track the output of the first stage flip-flop. The output of the second stage AND gate is input to the second stage flip-flop. This flip-flop is clocked by the destination time domain clock signal. This signal processing method is repeated at each of the remaining N−2 stages of the synchronizer of the present invention.

This operation of a synchronizer permits the initiation of the synchronous process before it is known whether the asynchronous signal should be input to a destination system. This results in a reduction in latency. If it is discovered at a later time that a particular asynchronous signal should not be input to a destination system after synchronization has begun, the ABORT signal may be asserted to block propogation of the asynchronous signal at one of the stages. This operation of the synchronizer of the present invention permits it to get a "head start" on converting an asynchronous signal to a synchronous signal, thereby reducing synchronizer latency.

The present invention will be described in detail in the remaining portion of this specification explained in light of the drawings.

BRIEF DESCRIPTION OF THE DRAWING

FIG. 4 is a timing diagram for the synchronizer of the present invention that is shown in FIG. 3.

DETAILED DESCRIPTION OF THE INVENTION

The present invention is an N-stage synchronizer that reduces the latency associated with the synchronization process without sacrificing reliability.

Figure 1:
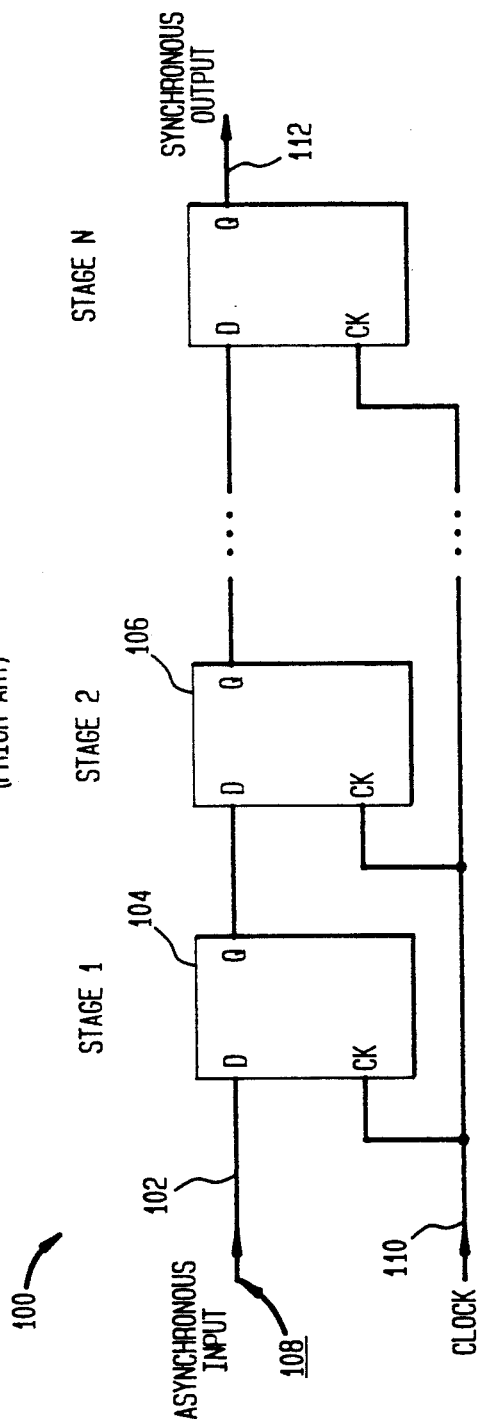
FIG. 1 is a schematic diagram of a prior art N-stage synchronizer.
Figure 3:
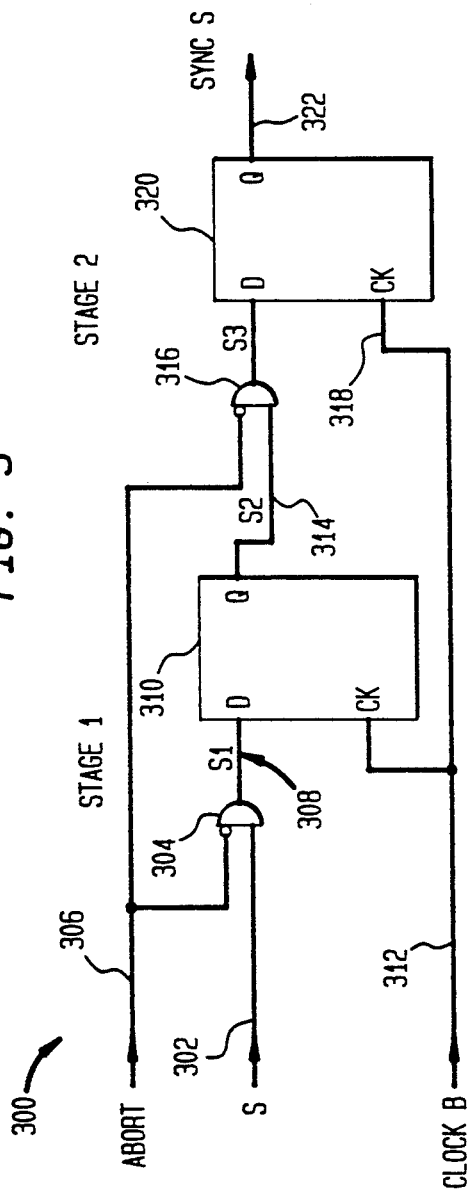
FIG. 3 is a schematic diagram of a synchronizer according to the present invention.

Referring to FIG. 3, the synchronizer of the present invention is shown generally at 300. The synchronizer has two stages. It is understood that even though only two stages are shown in FIG. 3, the N-stage synchronizer of the present invention may have many more stages.

There are three inputs to N-stage synchronizer 300. The first is S signal 302, the second is ABORT signal 306, and the third is CLOCK B signal 312. S signal 302 is an asynchronous signal that is to be synchronized. When asserted, ABORT signal 306 blocks synchronization of the asynchronous signal. CLOCK B signal 312 is the clocking signal for the destination time domain.

Asynchronous S signal 302 is the second input to first stage AND gate 304. The first signal input to AND gate 304 is ABORT signal 306 which is input to the negative/true input of AND gate 304. The output of first stage AND gate 304 is the S1 signal on line 308. The S1 signal will track the S signal as long as the ABORT signal is de-asserted. The S1 signal is input to the data input of first stage flip-flop 310. First stage flip-flop 310 is clocked by CLOCK B signal 312.

The output of first stage flip-flop 310 is the S2 signal on line 314. The S2 signal is the second input to second stage AND gate 316. The first input to second stage AND gate 316 is ABORT signal 306 which is input to the negative/true of AND gate 316.

The output of second stage AND gate 316 is the S3 signal on line 318. The S3 signal will track the S2 signal as long as the ABORT signal is de-asserted. The S3 signal is input to the data input of second stage flip-flop 320. The second stage flip-flop is clocked by CLOCK B signal 312. The output of the second stage flip-flop 320 is SYNC S signal 322 which is the synchronized version of S signal 302.

Referring to FIG. 4, the timing diagrams for the operation of the N-stage synchronizer of the present invention as shown in FIG. 3 will be discussed. In FIG. 4, the dotted lines represent the result if the ABORT signal is not asserted.

CLOCK A signal 400 is the clocking signal for asynchronous S signal 302 and ABORT signal 306. As shown, S signal 302 has a period equal to Clock A signal 400. ABORT signal 306 is not asserted unless it is determined that signal 302 is not to be synchronized and must be blocked.

Signal S 302 and ABORT signal 306 are input to first stage AND gate 304. As long as the ABORT signal 306 is de-asserted, the output of first stage AND gate 304 will track S1 signal 402.

During the period that S1 signal 402 is asserted and CLOCK B signal 312 is at the beginning of a cycle, the asserted S1 signal at the data input of first stage flip-flop 310 is clocked to the output of that flip-flop. This signal is S2 signal 404 (FIG. 4) on line 314. S2 signal 404 tracks the S1 signal 402 but lags it by up to one clock period of CLOCK B signal 312.

S2 signal 404 is input to second stage AND gate 316. As long as ABORT signal 306 is de-asserted, the output of AND gate 316 is S3 signal 406 (FIG. 4) on line 318 will track S2 signal 404. The S3 signal is input to the data input of flip-flop 320. This input signal is output from flip-flop 320 at the beginning of the next cycle of CLOCK B signal 312. This output is SYNC S signal 322, thus providing the synchronized version of asynchronous S signal 302 to the destination system.

As can be readily seen, if at any time it is determined during the synchronization process that asynchronous S signal 302 should not be provided to the destination system, ABORT signal 316 is asserted which blocks synchronization of asynchronous S signal 302 at an AND gate at one of the N synchronizer stages. This happens at the beginning of the cycle of CLOCK B signal 312 after ABORT signal 306 is asserted. The affects of asserting the ABORT signal is shown in FIG. 4 at S1 signal 402, S2 signal 404, and S3 signal 406.

Referring again to FIG. 4, if the time for determining whether the asynchronous S input 302 is to input to a destination system is at time t2, which is evidenced by the assert or de-assert of ABORT signal 306, and the synchronization process is initiated at t1, some of the latency associated with synchronization process is reduced.

Figure 5:
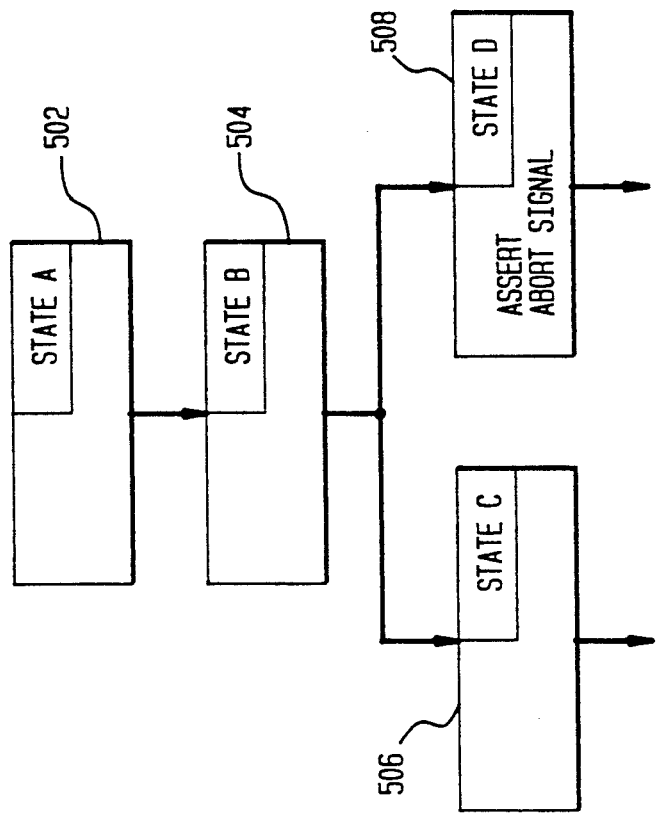
FIG. 5 is a block diagram of the operation of a state machine, which incorporates the present invention, that requires synchronization between two of its states.
Figure 2:
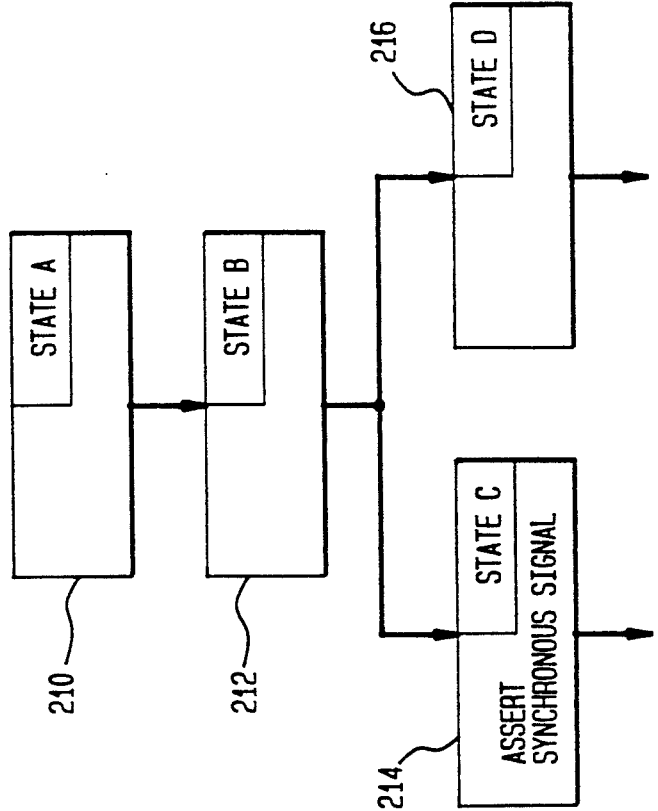
FIG. 2 is a block diagram of the conventional operation of a state machine that requires synchronization between two of its states.

Referring to FIG. 5, if the present invention was incorporated in state machine 500, which is similar to the state machine in FIG. 2, and the portion of state machine 500 that is shown includes State A 502, State B 504, State C 506, and State D 508, synchronization could be started in State B 504 before the decision is made whether to proceed to state C or state D. If State C 506 is selected which requires synchronization, the latency associated with the synchronization operation is reduced without affecting reliability. However, if State C 504 is not selected and State D 508 is selected, the ABORT signal is asserted to block synchronization of the asynchronization signal.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A N-stage synchronizer with an aborting mechanism for generating a synchronous signal from an asynchronous signal, comprising:
   a synchronizer input;
   a synchronizer output;
   N synchronizer stages connected in series between the synchronizer input and output, with each of the N synchronizer stages having input means for causing abortion of synchronization at that stage when a predetermined signal is input to the input means; and
   a clock signal in the time domain of the synchronous signal being generated, the clock signal for controlling timing of the N synchronizer stages.

2. The synchronizer as recited in claim 1, wherein each of the N synchronizer stages comprises a flip-flop and input means, with an output of the input means being connected to an input to the flip-flop.

3. The synchronizer as recited in claim 2, wherein the flip-flop includes a D-type flip-flop.

4. The synchronizer as recited in claim 2, wherein the input means includes a logic gate.

5. The synchronizer as recited in claim 4, wherein the logic gate includes an AND gate.

6. The synchronizer as recited in claim 5, wherein inputs to the AND gate at a first synchronizer stage are an asynchronous signal to be synchronized and the predetermined signal.

7. The synchronizer as recited in claim 6, wherein inputs to the AND gates of the N−1 synchronizer stages after a first synchronizer stage are an output of the previous series connected synchronizer stage and the predetermined signal.

8. A method for synchronizing an asynchronous signal with a N-stage synchronizer having an aborting mechanism, comprising the steps of:

inputting the asynchronous signal to be synchronized to input means of a first synchronizer stage along with a predetermined signal to begin the synchronization process before a decision is made whether synchronization is required;

inputting an output of a previous series connected synchronizer stage and the predetermined signal to input means of each of N−1 synchronizer stages after a first synchronizer stage; and aborting the synchronization process by changing the state of the predetermined signal when the decision is made that synchronization is not required after the synchronization process has started.

9. The method as recited in claim 8, wherein each of the N synchronizer stages comprises a flip-flop and an input means, with an output of the input means being connected to an input to the flip-flop.

10. The method as recited in claim 8, wherein the flip-flop includes a D-type flip-flop.

11. The method as recited in claim 9, wherein the input means includes a logic gate.

12. The method as recited in claim 11, wherein the logic gate includes an AND gate.

* * * * *